US012761878B2

(12) United States Patent
Craske

(10) Patent No.: US 12,761,878 B2
(45) Date of Patent: Oct. 13, 2026

(54) APPARATUS, A METHOD OF OPERATING MODULO K CALCULATION CIRCUITRY AND A NON-TRANSITORY COMPUTER-READABLE MEDIUM TO STORE COMPUTER-READABLE CODE FOR FABRICATION OF AN APPARATUS

(71) Applicant: Arm Limited, Cambridge (GB)

(72) Inventor: Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 1189 days.

(21) Appl. No.: 17/743,880

(22) Filed: May 13, 2022

(65) Prior Publication Data

US 2023/0367554 A1 Nov. 16, 2023

(51) Int. Cl.
*G06F 7/72* (2006.01)

(52) U.S. Cl.
CPC .................................... *G06F 7/727* (2013.01)

(58) Field of Classification Search
CPC ................................... G06F 7/72; G06F 7/727
See application file for complete search history.

(56) References Cited

U.S. PATENT DOCUMENTS

2011/0145311 A1* 6/2011 Jin .......................... G06F 7/727 708/491
2018/0121166 A1* 5/2018 Rose ....................... G06F 7/535
2020/0065066 A1* 2/2020 Källén .................. G06F 7/4873

OTHER PUBLICATIONS

J.R. Diamond, et al., Arbitrary Modulus Indexing, 2014 47th IEEE/ACM International Symposium on Microarchitecture, IEEE Computer Society, 2014 (Year: 2014).*

P. Athira et al., Modular Adder Designs Based On Thermometer Coding and One-Hot Coding, 2021 2nd International Conference on Advances in Computing, Communication, Embedded and Secure Systems (ACCESS) 2021 (Year: 2021).*

F. Jafarzadehpour et al., Efficient Modular Adder Designs Based on Thermometer and One-hot Coding, IEEE Transactions on Very Large Scale Integration (VLSI) Systems, vol. 27, No. 9, 2019 (Year: 2019).*

* cited by examiner

*Primary Examiner* — Emily E Larocque
(74) *Attorney, Agent, or Firm* — NIXON & VANDERHYE P.C.

(57) ABSTRACT

There is provided a method and an apparatus for calculating an output modulo k value of an input data value. The apparatus is provided with input data value analysis circuitry to consider the input data value as a plurality of partial operands, and to determine a plurality of modulo k values corresponding to the plurality of partial operands. The apparatus is provided with modulo k calculation circuitry comprising plural combination stages to replace one or more groups of input modulo k values with one or more combined modulo k values. The plural combination stages comprise a first combination stage to receive the plurality of modulo k values as inputs and to output an intermediate reduced plurality of modulo k values, and one or more further combination stages to sequentially combine one or more groups of the intermediate reduced plurality of modulo k values to generate the output modulo k value.

20 Claims, 15 Drawing Sheets

Case k=3

| (A+B) mod 3 | B=100<br>(2) | B=010<br>(1) | B=001<br>(0) |
|---|---|---|---|
| A=001<br>(0) | A+B mod 3=100<br>(2) | A+B mod 3=010<br>(1) | A+B mod 3=001<br>(0) |
| A=010<br>(1) | A+B mod 3=001<br>(0) | A+B mod 3=100<br>(2) | A+B mod 3=010<br>(1) |
| A=100<br>(2) | A+B mod 3=010<br>(1) | A+B mod 3=001<br>(0) | A+B mod 3=100<br>(2) |

FIG. 10

APPARATUS, A METHOD OF OPERATING MODULO K CALCULATION CIRCUITRY AND A NON-TRANSITORY COMPUTER-READABLE MEDIUM TO STORE COMPUTER-READABLE CODE FOR FABRICATION OF AN APPARATUS

TECHNICAL FIELD

The present invention relates to data processing. More particularly the present invention relates to an apparatus, a method of operating modulo k calculation circuitry and a non-transitory computer-readable medium to store computer-readable code for fabrication of an apparatus.

BACKGROUND

Some data processing apparatuses are required to calculate a modulo k value from an input value. Such calculation methods can be time consuming and involve division/multiplication logic, repeated application of subtraction, or extensive lookup tables. Therefore, there is a need for a simple circuit to compute modulo k values without the requirement for such logic blocks.

SUMMARY

In a first example configuration described herein there is an apparatus comprising:

- input data value analysis circuitry configured to consider an input data value as a plurality of partial operands, and to determine a plurality of modulo k values comprising a modulo k value derived from each of the plurality of partial operands; and
- modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values,
- wherein the plurality of combination stages comprises a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.

In a second example configuration described herein there is a method of operating modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values, the method comprising:

- considering an input data value as a plurality of partial operands, and determining a plurality of modulo k values comprising a modulo k value derived from each of the plurality of partial operands;
- with a first combination stage, receiving the plurality of modulo k values as inputs and outputting an intermediate reduced plurality of modulo k values; and
- with one or more further combination stages, sequentially combining one or more groups of the intermediate reduced plurality of modulo k values to generate an output modulo k value of the input data value.

In another example configuration described herein there is a non-transitory computer-readable medium to store computer-readable code for fabrication of an apparatus comprising:

- input data value analysis circuitry configured to consider an input data value as a plurality of partial operands, and to determine a plurality of modulo k values comprising a modulo k value derived from each of the plurality of partial operands; and
- modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values,
- wherein the plurality of combination stages comprises a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.

BRIEF DESCRIPTION OF THE DRAWINGS

The present invention will be described further, by way of example only, with reference to configurations thereof as illustrated in the accompanying drawings, in which:

FIG. 10 schematically illustrates further details of calculating modulo k values using k-bit one hot representations according to various configurations of the present techniques;

DESCRIPTION OF EXAMPLE CONFIGURATIONS

Figure 1:
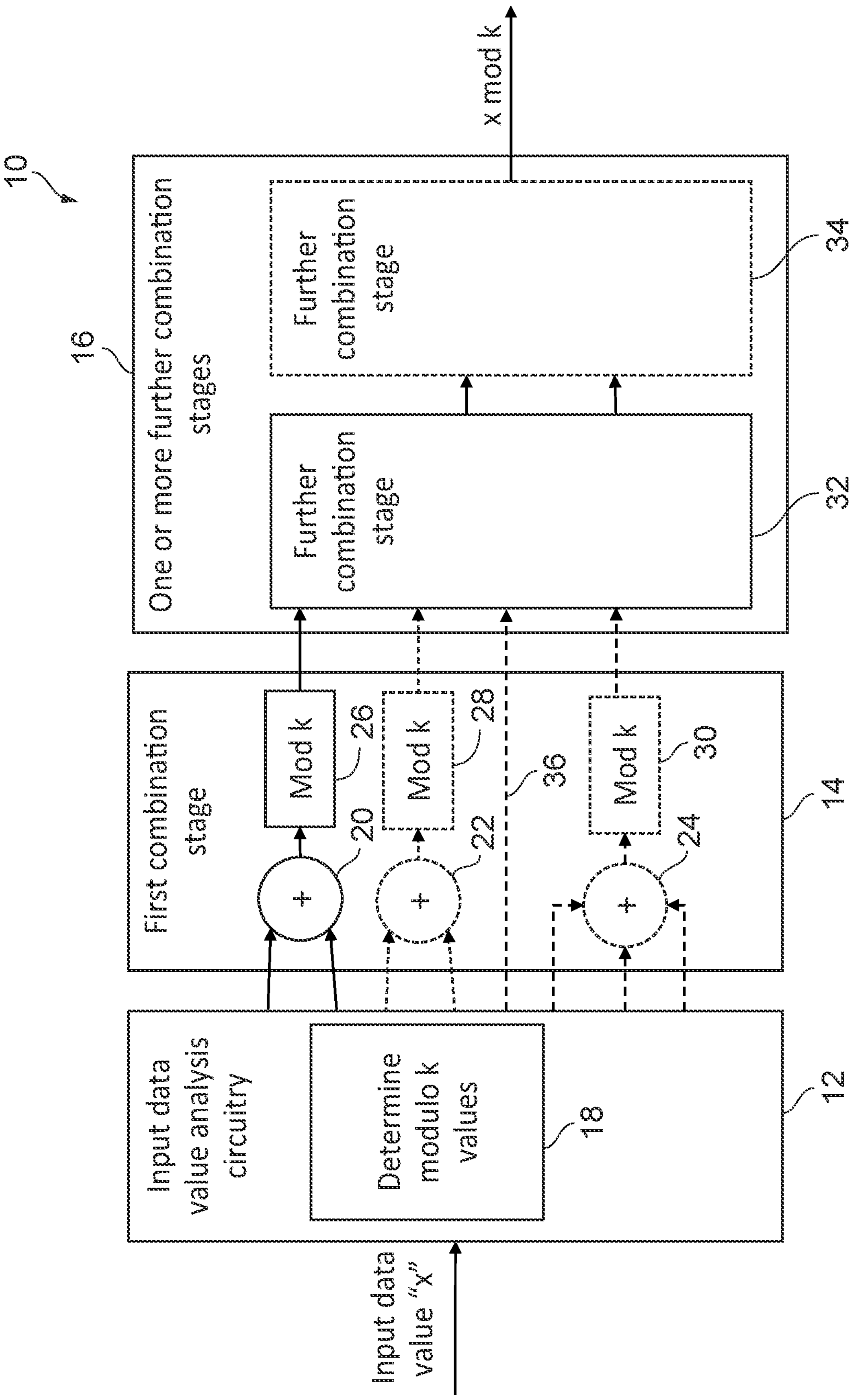
FIG. 1 schematically illustrates an apparatus for calculating a modulo k value for an input data value according to various configurations of the present techniques.

Before discussing the configurations with reference to the accompanying figures, the following description of configurations is provided.

In accordance with one example configuration there is provided an apparatus comprising input data value analysis circuitry configured to consider an input data value as a plurality of partial operands, and to determine a plurality of modulo k values comprising a modulo k value derived from each of the plurality of partial operands. The apparatus is also provided with modulo k calculation circuitry comprising a plurality of combination stages. Each of the combination stages is arranged to replace one or more groups of input modulo k values with one or more combined modulo k values. Each combined modulo k value is a modulo k value derived from a sum of an associated group of input modulo k values. As a result, the combination stage is arranged to generate a reduced plurality of modulo k values. Furthermore, the plurality of combination stages comprises at least a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.

For a given input data value, which may be denoted x, the output modulo k value, where k is any positive integer, is denoted x mod k. The modulo k value of x is defined as the remainder of x divided by k. The modulo operation is a lossy operation such that, for a given x there is a unique value of x mod k. However, there are many values of x that will produce the same value of mod k. Hence, it is not possible to derive the value of x from the solution x mod k because information has been lost during the calculation. As a trivial example, k=3, the value x mod k will be equal to 2 for values of x=2, 5, 8, 11, 14, etc. The inventors have realised that, rather than calculating a modulo k value of the entire input data value, an overall saving in the amount of logic required can be achieved by splitting the calculation into multiple stages and, at each stage, retaining only necessary information for the subsequent stages. To this end, the apparatus is provided with input data value analysis circuitry which is arranged to consider the input value to be composed of a number of different partial operands. In other words, the input data value analysis circuitry splits or decomposes the input data value into multiple partial operands that, when combined, are representative of the input data value. The input value calculation circuitry is then arranged to determine modulo k values that are representative of each of the partial operands.

The apparatus is further arranged to perform plural operations using a plurality of combination stages to combine the modulo k values that are representative of the plurality of partial operands to produce the output modulo k value. Each combination stage is arranged to take one or more groups of the modulo k values that are representative of the plurality of partial operands and, for each group, to combine the partial operands associated with that group to derive a modulo k value corresponding to the sum of that group of partial operands. As a result, the output of the combination stage is a reduced plurality of modulo k values which are used as the inputs for a further combination stage. In this way, the modulo k computation is split into a plurality of smaller operations resulting in an overall increase in efficiency and a reduction in circuit area. The input value x can take any form. In some configurations the input value x is an 8-bit binary number. In other configurations the input value x may for example be a 4-bit, 16-bit, or 32-bit value number. Furthermore, x is not limited to having a number of bits equal to an integer power of 2. Rather, in some configurations x is a non-integer power of 2. The combination stages and the input data value analysis circuitry can be provided as physically distinct and separate logic blocks or could be provided as a combined logic block that is functionally split into the different combination stages and the input data value analysis circuitry.

The number of input modulo k values in a group can be any number. In some configurations each of the one or more groups of input modulo k values is a pair of modulo k values, and each of the one or more groups of the intermediate reduced plurality of modulo k values is a pair of intermediate reduced modulo k values. As a result, each group considered by each combination stage produces half the number of output modulo k values that there are input modulo k values. By arranging the combination stages to work with pairs of input modulo k values, each of the logic blocks provided for combining a pair of input/reduced modulo k values is greatly simplified. Each logic block is required to perform the steps of adding the pair of input values and calculating the remainder of that value divided by k. As each input value itself is a modulo k value, then the largest number that the logic block is required to deal with is 2*(k−1). Hence, it is not necessary to provide a full adder circuit and a full divider circuit. Rather, a simplified logic block capable of calculating the modulo k value for a small set of possible input values can be provided.

The arrangement of the combination stages can be variously defined dependent on the requirements of the apparatus. In some configurations each of the plurality of combination stages is arranged to replace a single group of the input modulo k values with a single combined modulo k value. The remaining input modulo k values are output without being combined with another modulo k value to form, in combination with the single combined modulo k value, the reduced plurality of modulo k values. In this way a particularly compact circuit can be provided for each of the combination stages.

In some configurations, the apparatus is arranged such that in the first combination stage, the single group of the input modulo k values is a single group of the plurality of modulo k values, and in each of the one or more further combination stages the single group of the input modulo k values comprises at least one of the plurality of modulo k values and the combined modulo k value output from a preceding combination stage of the plurality of combination stages. As a result, the size of the reduced plurality of modulo k values decreases by M−1 for each combination stage, where M is the number of input modulo k values in the group. By incorporating the combined modulo k value output from the preceding stage, the combination stages can be designed to use a particular encoding form for the combined modulo k value which can improve efficiency.

In some configurations each of the plurality of combination stages comprises a plurality of combination units, each combination unit arranged to replace a different group of the one or more groups of input modulo k values with the combined modulo k value of the sum of that group of input modulo k values. By providing a plurality of combination units in each combination stage, the complexity of each of the combination stages can be simplified resulting in a more efficient implementation.

The number of combination units in each of the combination stages can be variously defined. In some configurations, the plurality of modulo k values comprises $2^N$ modulo k values, the first combination stage comprises $2^{N-1}$ combination units arranged to output the intermediate reduced plurality of modulo k values comprising $2^{N-1}$ intermediate modulo k values, and a number of combination units in each of the one or more further combination stages is half of a number of combination units in a preceding combination stage. As a result, for a $2^N$ bit input data value, N combination stages are required and a total number of combination units is equal to $2^N-1$. Furthermore, each combination unit is arranged to combine a pair of input modulo k values to produce an output modulo k value. As a result, each of the $2^N-1$ combination units can be provided as a simple circuit that does not require a full adder or a full divider circuit.

The plurality of partial operands can be variously defined. However, in some configurations a sum of the plurality of partial operands is equal to the input data value. The modulo k value of an input data value x where $x=\Sigma_j x_j$ can be written as:

$$x \bmod k = \left(\sum\nolimits_j x_j\right) \bmod k = \left(\sum\nolimits_j x_j \bmod k\right) \bmod k.$$

By exploiting this property and considering the input data value as a sum of a plurality of partial operands, the modulo k operation can be replaced with a sequence of smaller modulo k operations.

The plurality of partial operands can be any operands for which it is convenient to calculate the modulo k value. In some configurations each of the plurality of partial operands can be represented as a power of two. This approach takes advantage of the binary representation of the input data value by setting $x_j=2^j$ when the j-th least significant bit of the input data value is equal to 1 and $x_j=0$ when the j-th least significant bit of the input value is equal to 0. In this way the complexity of the input data value analysis circuitry is reduced because the input data value is already in an appropriate form for the input data value analysis circuitry to derive the modulo k values.

The modulo k values can be encoded using any appropriate representation. In some configurations the representation is a binary representation. In other configurations, at least one of the plurality of modulo k values is encoded using a k-bit one-hot representation. A k-bit one hot representation represents a value by using a sequence of k bits where only one of the k bits is set to a value of 1. The position of the bit set to 1 indicates the modulo k value. Using a k-bit representation is possible because a modulo k value takes values from 0 to k−1. Hence, there are only k possible values that can be used. In some configurations, the one hot representation is inverted and the hot bit is represented by a single 0 with all other bits set to 1.

The representation used by each of the input/reduced modulo k values does not necessarily have to be the same. In some configurations each of the one or more groups of input modulo k values for each of the plurality of combination stages includes at least one modulo k value encoded using the k-bit one-hot representation. In such configurations, the other modulo k values can be encoded using, for example, binary representation. In some configurations each of the plurality of modulo k values are encoded using the k-bit one-hot representation.

In some configurations, the combined modulo k value is encoded as a k-bit one-hot representation by barrel shifting one of the group of input modulo k values that is encoded using the k-bit one-hot representation by an amount determined by a sum of each other input modulo k value of the group of input modulo k values. Barrel shifting involves shifting the one hot representation by a number of places and causing data bits that are shifted off one end of the representation to be shifted into the other end of the representation. A barrel shifting circuit provides a particularly efficient implementation. Hence, by using a k-bit one hot representation for one of the input values, the circuitry required in the combination stages can be further simplified.

The apparatus can be arranged to output the output modulo k value in any format. In some configurations, the output modulo k value is encoded using the k-bit one-hot representation. The k-bit one hot representation is useful for providing to certain structures within the apparatus. For example, the k-bit one hot representation is advantageous where the modulo k value is being used to determine a particular circuit block of a plurality of circuit blocks to access or enable. One example of such a circuit block is a memory bank of a plurality of memory banks. In other configurations, the output modulo k value is converted from the k-bit one-hot representation to a binary representation. The binary representation provides a more compact representation of the output modulo k value.

Whilst k can be set to any value, in some configurations k equals three, and the output modulo k value is the two most significant bits of the k-bit one-hot representation. Advantageously, when k is equal to three, the binary representation is simply the two most significant bits of the 3-bit one hot representation. In particular, when the output modulo k value takes the value 2, the binary representation is 10 and the 3-bit one hot representation is 100; when the output modulo k value takes the value 1, the binary representation is 01 and the 3-bit one hot representation is 010; and when the output modulo k value takes the value 0, the binary representation is 00 and the 3-bit one hot representation is 001. In all these cases, the binary representation coincides with the two most significant bits of the 3-bit one hot representation. As a result, converting from the 3-bit one hot representation to the binary representation can be achieved by discarding the least significant bit of the 3-bit one hot representation.

The output modulo k value can be used for any purpose, for example, it can be stored in a register for further data processing operations. In some configurations, the output is used for a chip enable signal for a memory device consisting of k banks. In some systems the addressing of the banks of the memory device is achieved for an address x by calculating the value x mod k. Traditionally, memory devices have been provided with a number of banks equal to a power of two. In such cases, the calculation of x mod k has been straightforward. However, due to performance increases, it can be desirable to fit as many banks onto a memory device as possible, even where this does not correspond to a power of two. As a result, the calculation of which bank to use requires the calculation of modulo k values where k is not a power of two. The techniques described herein provide an efficient way in which to do this without requiring the inclusion of complex arithmetic units to calculate the modulo k values.

In some configurations the input data value analysis circuitry is configured such that a dependency of each of the plurality of modulo k values on a corresponding one of the plurality of partial operands is hardwired into the input data value analysis circuitry. Because the input value is treated as a plurality of partial operands which may not be in the form of modulo k numbers, the input data value analysis circuitry is arranged to calculate modulo k values for each of the plurality of partial operands. Whilst this can be achieved using a number of different methods, for example, using lookup tables or calculation circuitry, a compact implementation can be achieved by hardwiring the dependence of the modulo k values into the input value analysis circuitry. Hardwiring the modulo k values associated with each of the plurality of partial operands seems counter intuitive as, typically, hardwiring values can increase the circuit area. However, the input data value analysis circuitry is arranged to consider the input data value as composed of a discrete set of constituent parts (for example integer powers of two). Each of these constituent parts will either be present or not and, when present, will always result in a same modulo k value. For example, if each of the plurality of partial operands is a power of two representation each representation will, when the bit corresponding to that power of two representation is set, result in a predetermined (hardwired) modulo k value corresponding to that power of two representation being output or, if the bit corresponding to that power of two representation is not set, then the output will be zero.

The value of k can be any positive integer. However, in some configurations k is a number other than a power of two. When k is equal to a power of two (e.g. $k=2^p$, where p is a positive integer), the modulo k value is given by the p least significant bits of the input data value. This approach is not applicable for cases where k is not equal to a power of two. Hence, the techniques described herein provide a particularly advantageous approach for calculating modulo k values when k is not a power of two. In some configurations k equals three. In other configurations k equals five, six, or seven, etc.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. The code may comprise a myHDL representation which is subsequently compiled into a Verilog representation. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally, or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively, or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively, or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates an apparatus 10 according to various examples of the present techniques. The apparatus 10 is provided with input data value analysis circuitry 12, a first combination stage 14 and one or more further combination stages 16 including a first further combination stage 32 and, optionally, a second further combination stage 34. The apparatus 10 is arranged to calculate x mod k for an input data value x where k is a positive integer. The input data value analysis circuitry 12 receives the input data value which is considered, by the input data value analysis circuitry 12, as a plurality of partial operands. The input data value analysis circuitry 12 includes circuitry 18 arranged to determine a plurality of modulo k values, each derived from one of the plurality of partial operands. The plurality of modulo k values are passed to the first combination stage 14 which is arranged to take the plurality of modulo k values as inputs and to generate a reduced plurality of modulo k values. The first combination stage comprises a sequence of adding blocks 20, 22, 24 including adding block 20 and optional adding blocks 22 and 24, and a sequence of modulo k conversion blocks 26, 28, 30 including modulo k conversion block 26 and optional modulo k conversion blocks 28 and 30. In particular, addition block 20 receives two of the plurality of modulo k values as inputs and determines the sum of the two values. The output of the addition block 20 is passed to the modulo k conversion block 26 which calculates the modulo k value of the sum of the two input modulo k values. Optionally, addition block 22 receives two of the plurality of modulo k values as inputs and determines the sum of the two values. The output of the addition block 22 is passed to the modulo k conversion block 28 which calculates the modulo k value of the sum of the two input modulo k values. Optionally, the first combination stage receives an input modulo k value 36 that is output without being combined with any other modulo k values. Furthermore, the first combination stage 14 is provided with the optional addition block 24 that takes three input modulo k values from the input data value analysis circuitry 12. The optional addition block 24 calculates the sum of the three input values and generates an output that is passed to modulo k calculation circuitry 30 which calculates the modulo k value of the sum of the three input modulo k values. The output of the first combination stage 14 is a reduced plurality of modulo k values which are passed to the one or more further combination stages 16. In particular, the reduced plurality of modulo k values are passed to the further combination stage 32 which generates a further reduced plurality of modulo-k values that are passed to a second further combination stage 34 that combines the further reduced plurality of modulo-k values and outputs, as an output modulo k value, the value of x mod k. Each of the one or more further combination stages 16 comprises circuitry for adding input modulo k values and for calculating the modulo k value of the resulting addition.

In other configurations, the first combination stage may be arranged to contain different combinations of addition and modulo k calculation circuitry. Furthermore, the addition and modulo-k circuitry may be provided as separate logic blocks or can be combined into a single combined addition and modulo k calculation block. Further alternative arrangements of the first combination stage 14 and the one or more further combination stages 16 would be readily apparent to the skilled person.

Figure 2:
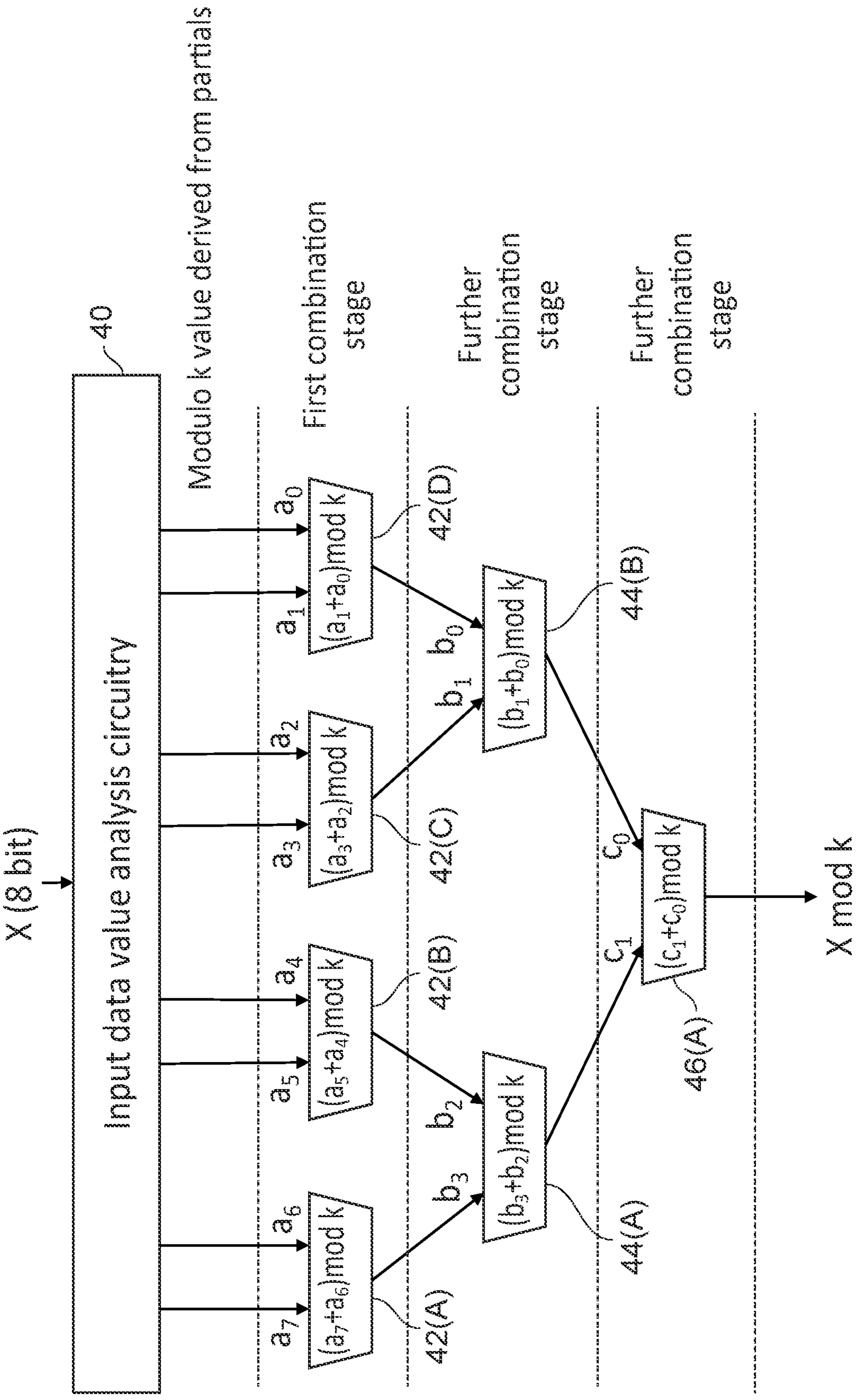
FIG. 2 schematically illustrates the use of combination stages to calculate a modulo k value of an input data value according to various configurations of the present techniques.

FIG. 2 schematically illustrates further details of the apparatus according to various example configurations. The apparatus is provided with input data value analysis circuitry 40. The input data value analysis circuitry is arranged to take an 8-bit input data value X which is considered to be composed of a plurality of partial operands such that the sum of the plurality of the partial operands is equal to the input data value X. The input data value analysis circuitry 40 is arranged to derive and output a modulo k value of each of the plurality of partial operands. The modulo k values derived from the partial operands are passed to a first combination stage and, subsequently through two further combination stages. Each combination stage (the first combination stage and each of the further combination stages) takes pairs of the plurality of modulo k values provided by the preceding stage and outputs a reduced plurality of modulo k values by combining the pairs of modulo k values provided by the preceding stage.

The first combination stage takes 8 input modulo k values ($a_0$, $a_1$, $a_2$, $a_3$, $a_4$, $a_5$, $a_6$, and $a_7$). Input modulo k values $a_7$ and $a_6$ are combined in combination unit 42(A) which is arranged to output a modulo k value $b_3=(a_7+a_6)$ mod k. Input modulo k values as and as are combined in combination unit 42(B) which is arranged to output a modulo k value $b_2=(a_5+a_4)$ mod k. Input modulo k values $a_3$ and $a_2$ are combined in combination unit 42(C) which is arranged to output a modulo k value $b_1=(a_3+a_2)$ mod k. Input modulo k values $a_1$ and $a_0$ are combined in combination unit 42(D) which is arranged to output a modulo k value $b_0=(a_1+a_0)$ mod k. The total output from the first combination stage is therefore a reduced plurality of modulo k values comprising $b_0$, $b_1$, $b_2$, and $b_3$.

The first further combination stage takes the 4 input modulo k values ($b_0$, $b_1$, $b_2$, and $b_3$) that were output by the first combination stage. Input modulo k values $b_3$ and $b_2$ are combined in combination unit 44(A) which is arranged to output a modulo k value $c_1=(b_3+b_2)$ mod k. Input modulo k values $b_1$ and $b_0$ are combined in combination unit 44(B) which is arranged to output a modulo k value $c_0=(b_1+b_0)$ mod k. The total output from the first further combination stage is therefore a reduced plurality of modulo k values comprising $c_0$, and $c_1$.

The second further combination stage takes 2 input modulo k values ($c_0$ and $c_1$) that were output by the first further combination stage. Input modulo k values $c_1$ and $c_0$ are combined in combination unit 46(A) which is arranged to output a modulo k value X mod $k=(c_1+c_0)$ mod k. The output of the second further combination stage is therefore the output modulo k value calculated for the input data value X.

Overall, the modulo k calculation circuit is arranged to make repeated use of the formula X mod $k=(\Sigma_j x_j)$ mod $k=(\Sigma_j x_j \bmod k)$ mod k. The input data value analysis circuit considers X to be equal to $\Sigma_j x_j$ and calculates $x_j$ mod k from these values. Mathematically, this can be expressed as $$a_j = x_j \bmod k, \text{ for all } j.$$

It can be seen that once this has been achieved X mod k can be written as:

$$X \bmod k = \left(\sum_j a_j\right) \bmod k$$

or, in full:

$$X \bmod k = (a_0 + a_1 + a_2 + a_3 + a_4 + a_5 + a_6 + a_7) \bmod k$$

which can be expressed as $$X \bmod k = ((a_0 + a_1 + a_2 + a_3) \bmod k + (a_4 + a_5 + a_6 + a_7) \bmod k) \bmod k$$

where $$(a_0 + a_1 + a_2 + a_3) \bmod k = ((a_0 + a_1) \bmod k + (a_2 + a_3) \bmod k) \bmod k$$

$$(a_4 + a_5 + a_6 + a_7) \bmod k = ((a_4 + a_5) \bmod k + (a_6 + a_7) \bmod k) \bmod k$$

By defining $$b_0 = (a_0 + a_1) \bmod k,$$

$$b_1 = (a_2 + a_3) \bmod k,$$

$$b_2 = (a_4 + a_5) \bmod k,$$

$$b_3 = (a_6 + a_7) \bmod k,$$

$$c_0 = (b_0 + b_1) \bmod k, \text{ and}$$

$$c_1 = (b_2 + b_3) \bmod k.$$

It can be seen that $$X \bmod k = (c_0 + c_1) \bmod k$$

Hence, the apparatus calculates the value of X mod k, where X is an 8-bit number, using seven combination units split between three combination stages.

Figure 3:
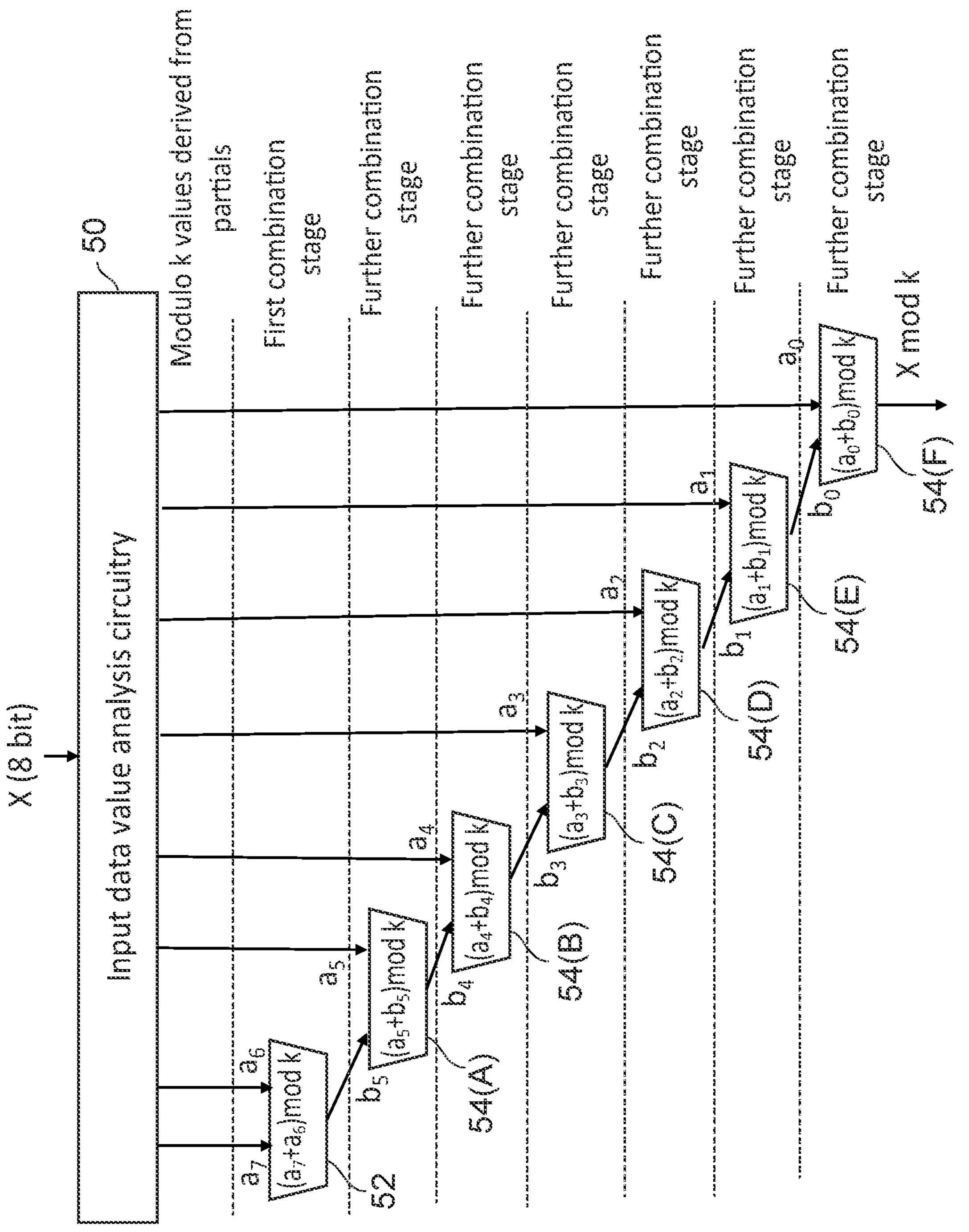
FIG. 3 schematically illustrates the use of combination stages to calculate a modulo k value of an input data value according to various configurations of the present techniques.

FIG. 3 schematically illustrates an alternative arrangement for calculating the value of X mod k for an input value of X. As in FIG. 2, the input data value analysis circuitry 50 is arranged to take an 8-bit input data value X which is considered to be composed of a plurality of partial operands such that the sum of the plurality of the partial operands is equal to the input data value X. The input data value analysis circuitry 50 is arranged to output each of the plurality of partial operands as a modulo k value derived from that partial operands. The modulo k values derived from the partial operands are passed to a first combination stage and, subsequently through six further combination stages. Each combination stage (the first combination stage and each of the further combination stages) takes a single pair of the plurality of modulo k values provided by the preceding stage and outputs a reduced plurality of modulo k values by combining that pair of modulo k values provided by the preceding stage.

The first combination stage has a single combination unit 52 that takes input values $a_7$ and $a_6$. The combination unit 52 calculates the value of $b_5=(a_7+a_6)$ mod k as one of the reduced plurality of modulo k values to be output by the first combination stage. The remaining modulo k values that form the reduced plurality of modulo k values output by the first combination stage are those that were not input into the combination unit 52 of the first combination stage. Hence, the reduced plurality of modulo k values comprises $b_5$, $a_5$, $a_4$, $a_3$, $a_2$, $a_1$, and $a_0$. The reduced plurality of modulo k values produced by the first combination stage are passed to the first further combination stage which comprises a single combination unit 54(A).

Each of the further combination stages comprises a single combination unit 54 that takes input values from the reduced plurality of modulo k values produced by the preceding stage and outputs a new reduced plurality of modulo k values after combining two of the input values. Combination unit 54(A) takes input values $b_5$ and $a_5$ and calculates the value of $b_4=(a_5+b_5)$ mod k as one of the new reduced plurality of modulo k values to be output by the first further combination stage. Combination unit 54(B) takes input values $b_4$ and $a_4$ and calculates the value of $b_3=(a_4+b_4)$ mod k as one of the new reduced plurality of modulo k values to be output by the second further combination stage. Combination unit 54(C) takes input values $b_3$ and $a_3$ and calculates the value of $b_2=(a_3+b_3)$ mod k as one of the new reduced plurality of modulo k values to be output by the third further combination stage. Combination unit 54(D) takes input values $b_2$ and $a_2$ and calculates the value of $b_1=(a_2+b_2)$ mod k as one of the new reduced plurality of modulo k values to be output by the fourth further combination stage. Combination unit 54(E) takes input values $b_1$ and $a_1$ and calculates the value of $b_0=(a_1+b_1)$ mod k as one of the new reduced plurality of modulo k values to be output by the fifth further combination stage. Combination unit 54(F) takes input values $b_0$ and $a_0$ and calculates the value of X mod $k=(a_0+b_0)$ mod k as one of the new reduced plurality of modulo k values to be output by the sixth further combination stage.

The preceding figures illustrate two alternatives in which, for the case where each combination unit takes a pair of inputs, the number of combination stages is minimised (FIG. 2) and the case in which the complexity of each combination stage is minimised (FIG. 3). It would be readily apparent to the skilled person that any number of combination units can be provided using any number of combination stages. One such alternative configuration of the combination stages is provided in FIG. 4.

Figure 4:
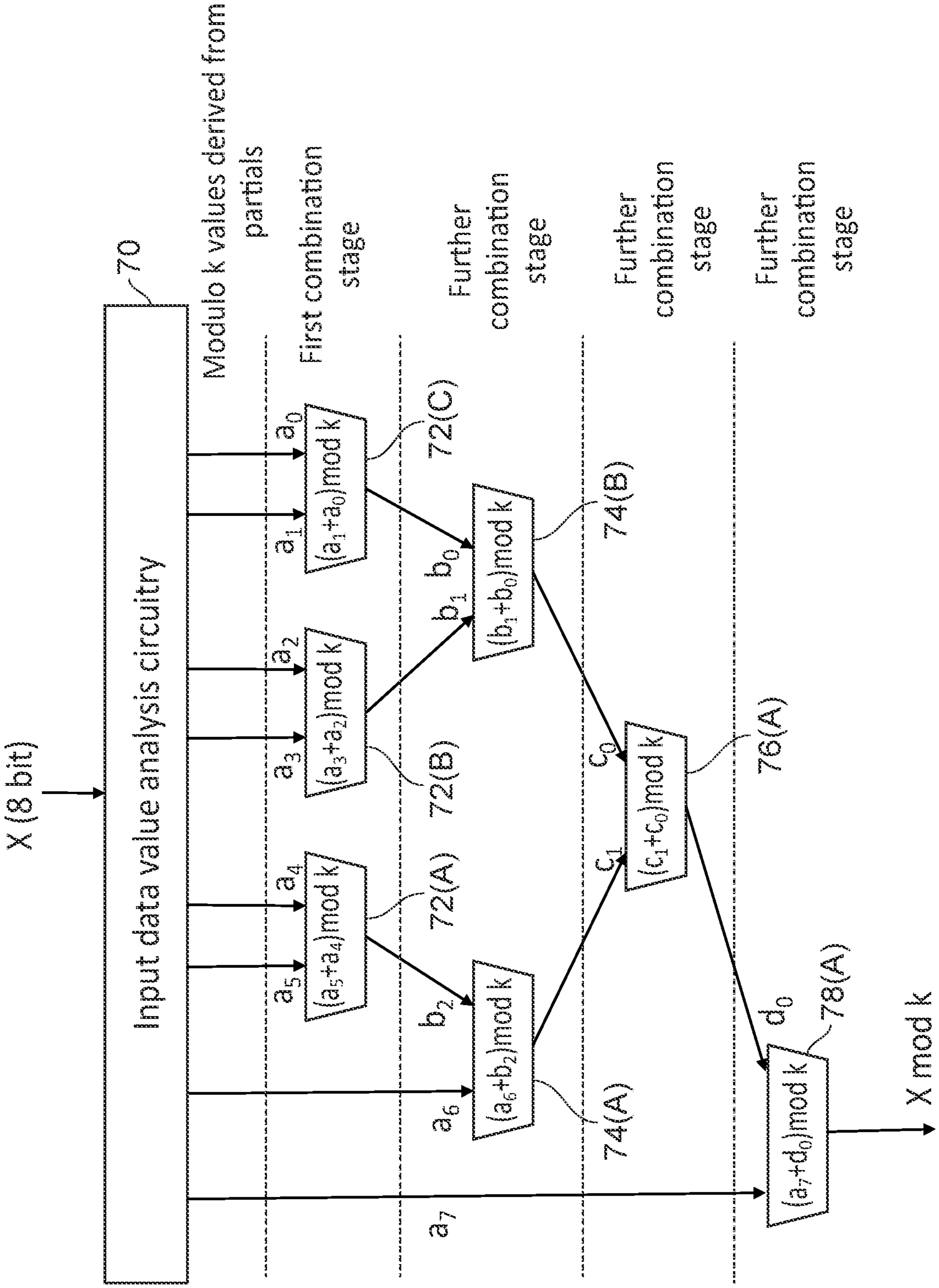
FIG. 4 schematically illustrates the use of combination stages to calculate a modulo k value of an input data value according to various configurations of the present techniques.

FIG. 4 schematically illustrates an alternative arrangement for calculating the value of X mod k for an input value of X. As in FIGS. 2 and 3, the input data value analysis circuitry 70 is arranged to take an 8-bit input data value X which is considered to be composed of a plurality of partial operands such that the sum of the plurality of the partial operands is equal to the input data value X. The input data value analysis circuitry 70 is arranged to output each of the plurality of partial operands as a modulo k value derived from that partial operands. The modulo k values derived from the partial operands are passed to a first combination stage and, subsequently through six further combination stages. Each combination stage (the first combination stage and each of the further combination stages) takes a single pair of the plurality of modulo k values provided by the preceding stage and outputs a reduced plurality of modulo k values by combining that pair of modulo k values provided by the preceding stage.

The first combination stage takes 8 input modulo k values ($a_0$, $a_1$, $a_2$, $a_3$, $a_4$, $a_5$, $a_6$, and $a_7$). Input modulo k values $a_7$ and ah are not combined and, instead, are output as part of the reduced plurality of modulo k values without being modified. Input modulo k values as and $a_4$ are combined in combination unit 72(A) which is arranged to output a modulo k value $b_2=(a_5+a_4)$ mod k. Input modulo k values $a_3$ and $a_2$ are combined in combination unit 72(B) which is arranged to output a modulo k value $b_1=(a_3+a_2)$ mod k. Input modulo k values $a_1$ and $a_0$ are combined in combination unit 72(C) which is arranged to output a modulo k value $b_0=(a_1+a_0)$ mod k. The total output from the first combination stage is therefore a reduced plurality of modulo k values comprising $b_0$, $b_1$, $b_2$, $a_6$, and $a_7$.

The first further combination stage takes 5 input modulo k values ($b_0$, $b_1$, $b_2$, $a_6$, and $a_7$). Input modulo k value $a_7$ is not combined with any other value and, instead, is output as part of the reduced plurality of modulo k values without being modified. Input modulo k values $a_6$ and $b_2$ are combined in combination unit 74(A) which is arranged to output a modulo k value $c_1=(a_6+b_2)$ mod k. Input modulo k values $b_1$ and $b_0$ are combined in combination unit 74(B) which is arranged to output a modulo k value $c_0=(b_1+b_0)$ mod k. The total output from the first further combination stage is therefore a reduced plurality of modulo k values comprising $c_0$, $c_1$, and $a_7$.

The second further combination stage takes 3 input modulo k values ($c_0$, $c_1$, and $a_7$). Input modulo k value $a_7$ is not combined with any other value and, instead, is output as part of the reduced plurality of modulo k values without being modified. Input modulo k values $c_1$ and $c_0$ are combined in combination unit 76(A) which is arranged to output a modulo k value $d_0=(c_0+c_1)$ mod k. The total output from the second further combination stage is therefore a reduced plurality of modulo k values comprising $d_0$ and $a_7$.

The third further combination stage takes 3 input modulo k values ($d_0$ and $a_7$). Input modulo k values do and $a_7$ are combined in combination unit 78(A) which is arranged to output a modulo k value X mod $k=(d_0+a_7)$ mod k.

The choice of which inputs are combined within a given combination stage is not important and any groups of input values can be combined within a given combination stage in order to generate a reduced plurality of modulo k values to be passed to the next combination stage.

Figure 5:
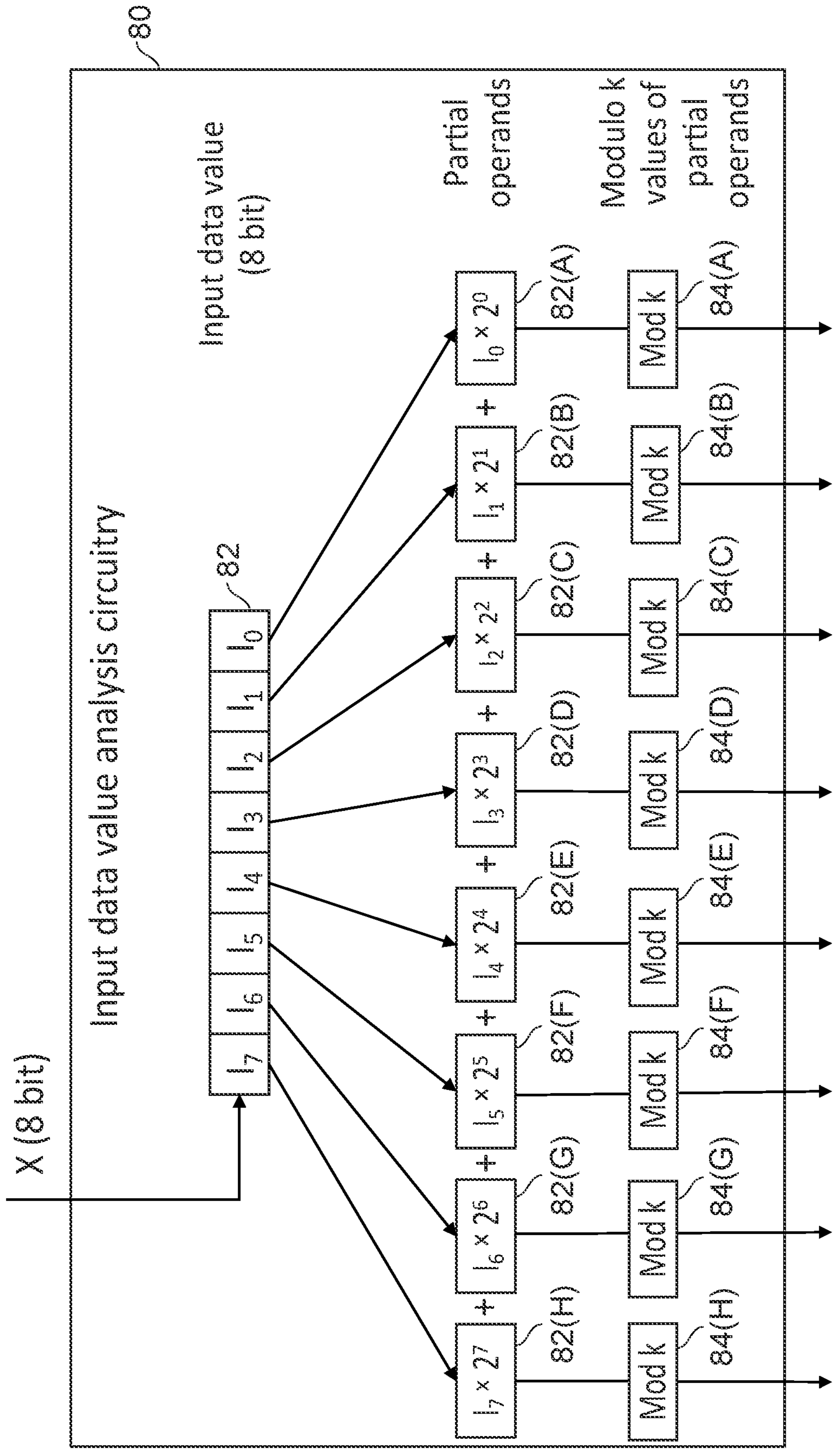
FIG. 5 schematically illustrates the use of input data value analysis circuitry to determine a set of modulo k values according to various configurations of the present techniques.

FIG. 5 schematically illustrates further details of the input data value analysis circuitry 80. The input data value analysis circuitry 80 receives an input data value X 82 which, in the illustrated configuration, is an 8 bit input data value X 82 with bits $I_7$ down to $I_0$. The input data value analysis circuitry 80 is arranged to consider the input data value X 82 as a plurality of partial operands. In particular, the input data value analysis circuitry 80 considers the input data value X 82 to be made up of a number of partial operands each of which is a power of two. In other words, the input data value analysis circuitry 80 considers the input value X 82 to be made up of $I_0$ lots of $2^0$ as the zeroth partial operand 82(A), $I_1$ lots of $2^1$ as the first partial operand 82(B), $I_2$ lots of $2^2$ as the second partial operand 82(C). $I_3$ lots of $2^3$ as the third partial operand 82(D), $I_4$ lots of $2^4$ as the fourth partial operand 82(E), $I_5$ lots of $2^5$ as the fifth partial operand 82(F), $I_6$ lots of $2^6$ as the sixth partial operand 82(G), and $I_7$ lots of $2^7$ as the seventh partial operand 82(H), where each of $I_0$, $I_1$, $I_2$, $I_3$, $I_4$, $I_5$, $I_6$, and $I_7$ is a binary number taking value 1 or 0. The input data value analysis circuitry 80 is arranged to compute the modulo k representation 84 of each of the partial operands. The modulo k values 84 of each of the plurality of partial operands 82 are output by the input data value analysis circuitry 80 to be passed to the plurality of combination stages.

Figure 6:
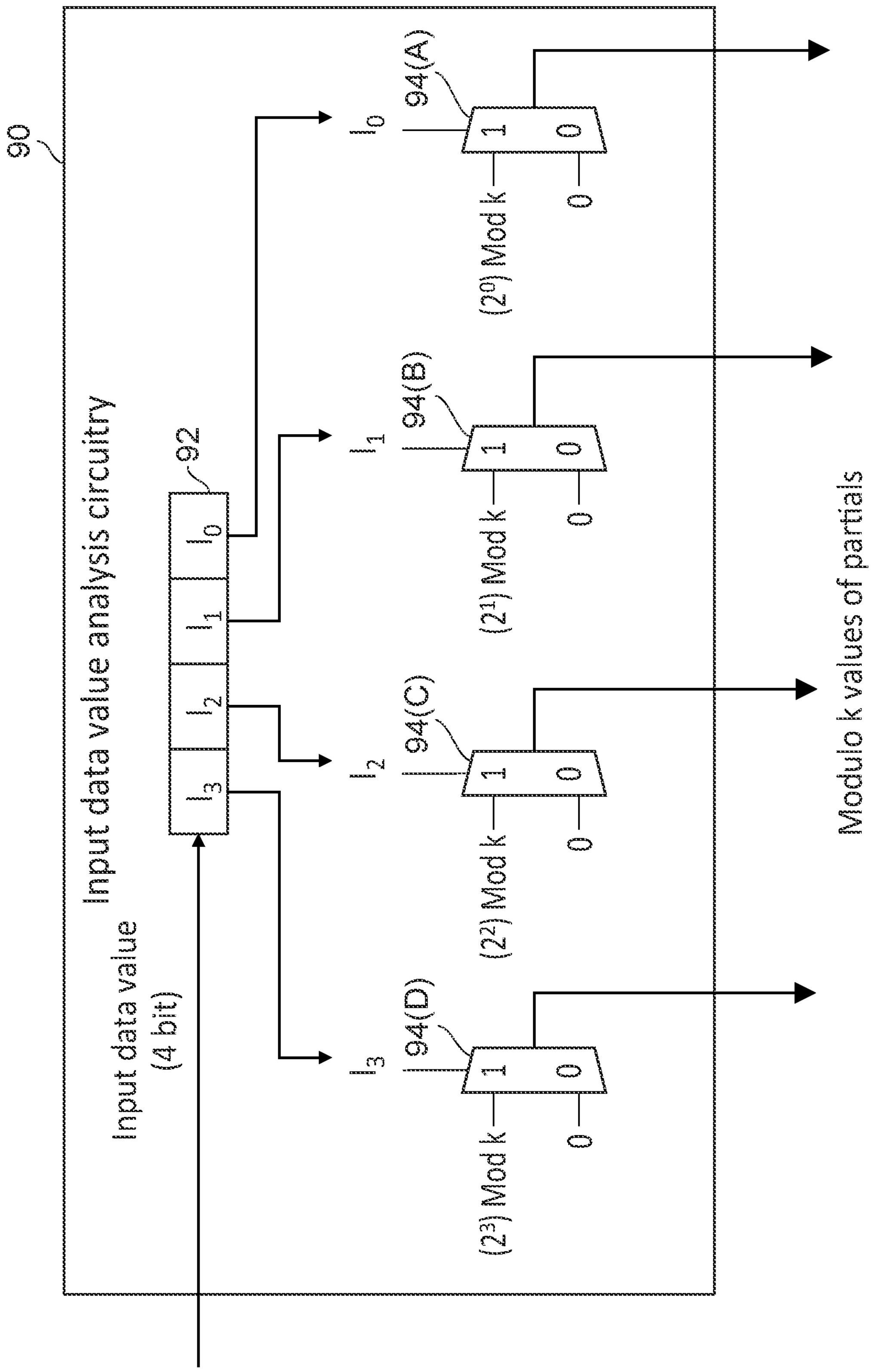
FIG. 6 schematically illustrates further details of the use of input data value analysis circuitry to determine a set of modulo k values according to various configurations of the present techniques.

FIG. 6 schematically illustrates further details of the input data value analysis circuitry 90 according to various configurations of the present techniques. In the illustrated configuration the input data value is provided as a four bit value. A 4 bit input data value 92 is used for clarity of illustration. It would be readily apparent to the skilled person that the techniques described herein could be extended to data values comprising any number of bits. The input data value 92 has bits $I_0$, $I_1$, $I_2$, and $I_3$. As in FIG. 5, each bit of the input data value 92 is considered as representing one of the plurality of partial operands. In particular, $I_0$ determines whether 1 or 0 lots of $2^0$ are present in the input data value 92. This value is fed to multiplexor 94(A) which outputs the value of 0 when $I_0=0$ and outputs a value of $(2^0)$ mod k when $I_0=1$. $I_1$ determines whether 1 or 0 lots of $2^1$ are present in the input data value 92. This value is fed to multiplexor 94(B) which outputs the value of 0 when $I_1=0$ and outputs a value of $(2^1)$ mod k when $I_1=1$. $I_2$ determines whether 1 or 0 lots of $2^2$ are present in the input data value 92. This value is fed to multiplexor 94(C) which outputs the value of 0 when $I_2=0$ and outputs a value of $(2^2)$ mod k when $I_2=1$. $I_3$ determines whether 1 or 0 lots of $2^3$ are present in the input data value 92. This value is fed to multiplexor 94(D) which outputs the value of 0 when $I_3=0$ and outputs a value of $(2^3)$ mod k when $I_3=1$.

Figure 7:
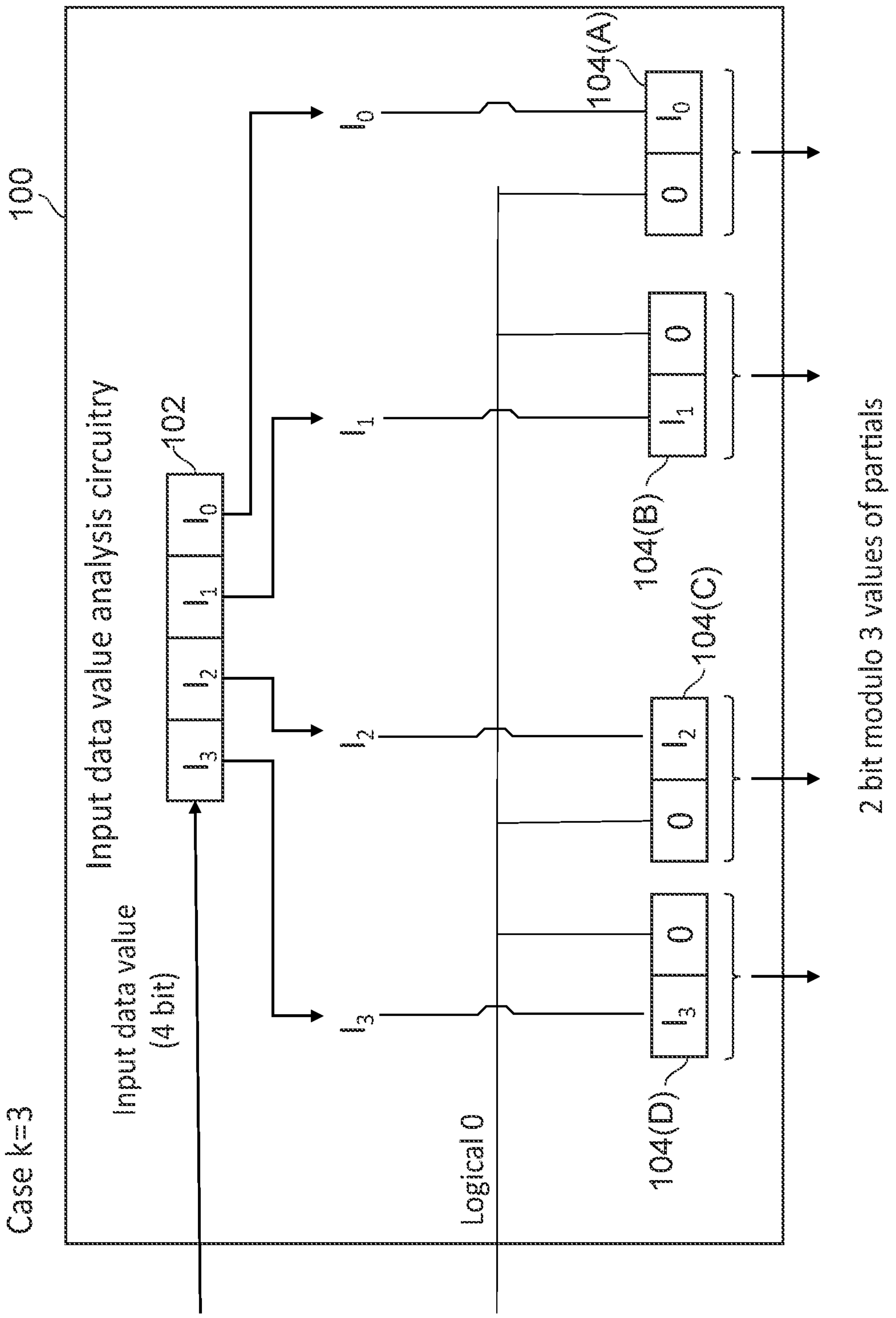
FIG. 7 schematically illustrates further details of the use of input data value analysis circuitry to determine a set of modulo k values according to various configurations of the present techniques.

A physical multiplexor circuit need not be provided. Rather, as is illustrated in FIG. 7 for the case k=3, the modulo k values to be output comprise a number of bits (2 bits for the case k=3) which either are always zero (independent of the value of $I_j$ for j=0 . . . 3) or take the value of $I_j$ (independent of the value of $I_j$ for j=0 . . . 3). Hence, the modulo k representation can be provided by outputting the values of $I_j$ at appropriate positions in the modulo k representations. In the illustrated configuration for the case k=3, the input data value analysis circuitry 100 is arranged to output a value of $[0,I_0]$ 104(A) as one of the modulo k values. This is based on the knowledge that $(2^0)$ mod 3=1. Hence, when $I_0=1$ a modulo k value of $[0,I_0]=[0,1]$ is output and when $I_0=0$ a modulo k value of $[0,I_0]=[0,0]$ is output. The input data value analysis circuitry 100 is arranged to output a value of $[I_1,0]$ 104(B) as one of the modulo k values. This is based on the knowledge that $(2^1)$ mod 3=2. Hence, when $I_1=1$ a modulo k value of $[I_0,0]=[1,0]$ is output and when $I_1=0$ a modulo k value of $[I_0,0]=[0,0]$ is output. The input data value analysis circuitry 100 is arranged to output a value of $[0,I_2]$ 104(C) as one of the modulo k values. This is based on the knowledge that $(2^2)$ mod 3=1. Hence, when $I_2=1$ a modulo k value of $[0,I_2]=[0,1]$ is output and when $I_0=0$ a modulo k value of $[0,I_0]=[0,0]$ is output. The input data value analysis circuitry 100 is arranged to output a value of $[I_3,0]$ 104(D) as one of the modulo k values. This is based on the knowledge that $(2^3)$ mod 3=2. Hence, when $I_3=1$ a modulo k value of $[I_3,0]=[1,0]$ is output and when $I_3=0$ a modulo k value of $[I_3,0]=[0,0]$ is output. In this way, the modulo k values of the partial operands are hardwired into the input data value analysis circuitry 100 and the input modulo k values can be provided without requiring the input data value analysis circuitry to include complex addition or division circuitry and without the requirement for storing a lookup table.

Figure 8:
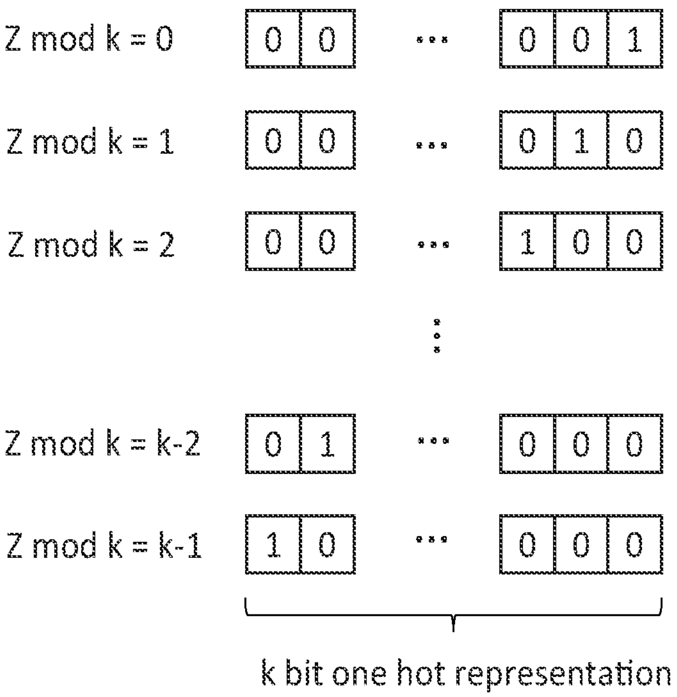
FIG. 8 schematically illustrates the use of k bit one hot representations to encode data values according to various configurations of the present techniques.

FIG. 8 schematically illustrates the use of a k-bit one hot representation of the values of Z mod k. The k-bit one hot representation is a binary representation where only a single bit (the hot value) of the k-bit one hot representation takes a first value of the binary representation and each other bit of the k-bit one hot representation takes a second value (different from the first value) of the k-bit one hot representation. Typically, such a representation is implemented with a single bit taking a value of a logical 1. However, implementations in which only a single bit takes a logical 0 are also envisaged. The position of the hot value determines the number that is represented by the k-bit one hot representation. The k-bit one hot representation is useful for representing the result of the operation Z mod k because there are only k possible values that can result from this calculation. Furthermore, using a k-bit one hot representation can simplify the logic used in the combination units and can provide an output that is already in an appropriate format for activating banks within a storage structure. FIG. 8 schematically illustrates how each of the k possible outputs from the operation Z mod k can be represented. In particular, Z mod k=0 is represented as a sequence of k−1 zeros followed by a single 1, Z mod k=1 is represented as a sequence of k−2 zeros followed by a single 1 and a final single 0. Z mod k=2 is represented as a sequence of k−3 zeros followed by a single 1 followed by 2 zeros, Z mod k=k−2 is represented by a single zero, a single 1 and k−2 zeros, and Z mod k=k=1 is represented by a single 1 followed by k−1 zeros. In general Z mod k=Y can be written as k−Y−1 zeros followed by a single 1 followed by Y zeros.

Figure 9:
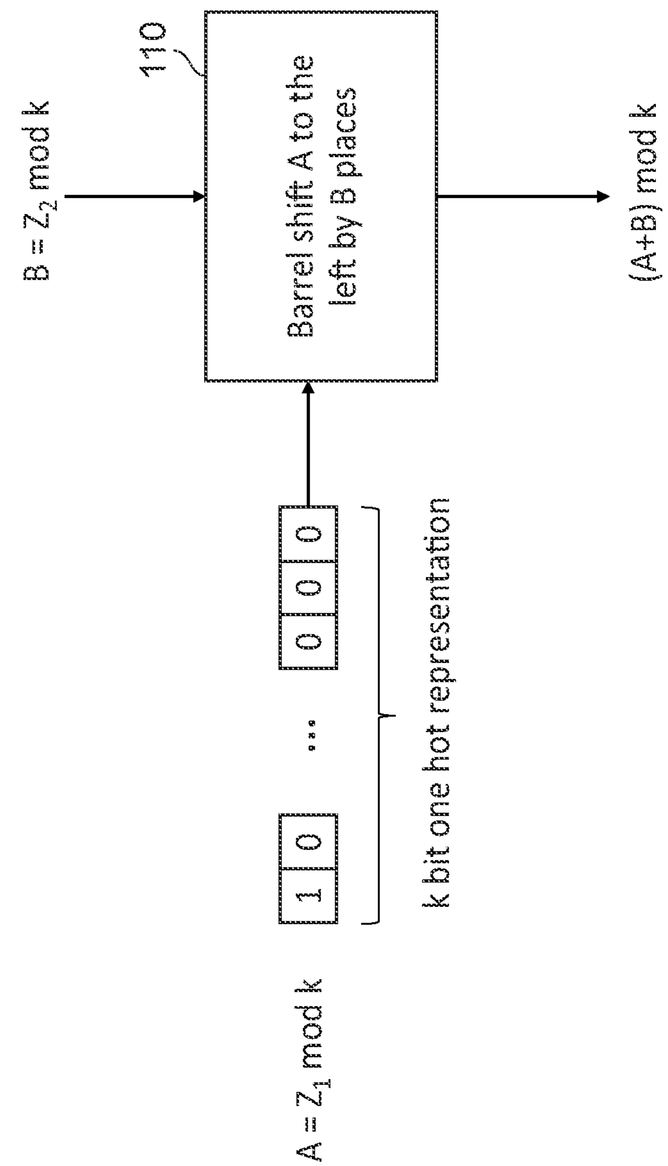
FIG. 9 schematically illustrates the use of barrel shifting circuitry to calculate a modulo k value according to various configurations of the present techniques.

FIG. 9 schematically illustrates the use of a k-bit one hot representation in one of the combination units 110 of a combination stage. In the illustrated configuration two inputs modulo k values (A and B) are provided. Modulo k value A is represented using the k-bit one hot representation. Modulo k value B can be represented in any way, for example, using a k-bit one hot representation or using a standard binary representation. The combination unit 110 receives input values A and B and performs a barrel shift operation to shift the k-bit one hot representation used by A to the left by B places. A barrel shift operation is a shift operation that shifts bits one input (input A in this case) by a number of values. Values that are shifted off the end of the one input (input A in this case) are fed back into the other end of the value. In other words, barrel shifting A (k-bit one hot representation) by B places is equivalent to adding the value of B to A. However, if A+B is a value that cannot be represented by the k-bit one hot representation then it is also not a modulo k number. The effect of barrel shifting this value is equivalent to subtracting k from the result of A+B. Hence, the barrel shifted value will automatically result in a modulo k representation of the value of A+B.

This is illustrated in further detail for the case k=3 in FIG. 10 for each possible value of A and B. Each row corresponds to a different value of A using the one-hot representation (the value in parentheses corresponds to the decimal representation corresponding to the one hot representation). Each column corresponds to a different value of B using the one-hot representation. The values of A+B mod k are obtained by barrel shifting A to the left by a number of places determined by the value of B. When A=001 (0) and B=100 (2), A is barrel shifted by two places to the left resulting in A+B mod 3=100 (2). When A=001 (0) and B=010 (1), A is barrel shifted by one place to the left resulting in A+B mod 3=010 (1). When A=001 (0) and B=001 (0), A is barrel shifted by zero places to the left resulting in A+B mod 3=001 (0).

When A=010 (1) and B=100 (2), the result of A+B in decimal is A+B=3 which is not a modulo 3 number. The modulo 3 representation of A+B can be obtained by sequentially subtracting 3 from A+B until the result is a modulo 3 number. In this case, 3 needs to be subtracted once to result in a value of A+B mod k=001 (0). This is achieved automatically through the process of barrel shifting because the action of shifting a number from the most significant bit of the k-bit one hot representation is equivalent to adding 1 and subtracting k. When A=010 (1) and B=010 (1), the value of A+B mod k=100 (2) and when A=010 (1) and B=001 (0), the value of A+B mod k=010(1).

When A=100 (2) and B=100(2), the result of A+B in decimal is A+B=4. As this is not a modulo 3 number, the value of A+B mod 3 could be determined by sequentially subtracting 3 until the result is a modulo 3 number. In this case, 3 only needs to be subtracted once to obtain A+B mod k=010 (1). This is automatically achieved through the process of barrel shifting because the action of shifting a number from the most significant bit of the k-bit one hot representation is equivalent to adding 1 and subtracting k. Similarly, when A=100 (2) and B=010 (1), the value of A+B mod 3 obtained by barrel shifting is A+B mod k=001 (0). When A=100 (2) and B=001 (0), A is barrel shifted to the left by zero places and A+B mod 3=100 (2).

Figure 11:
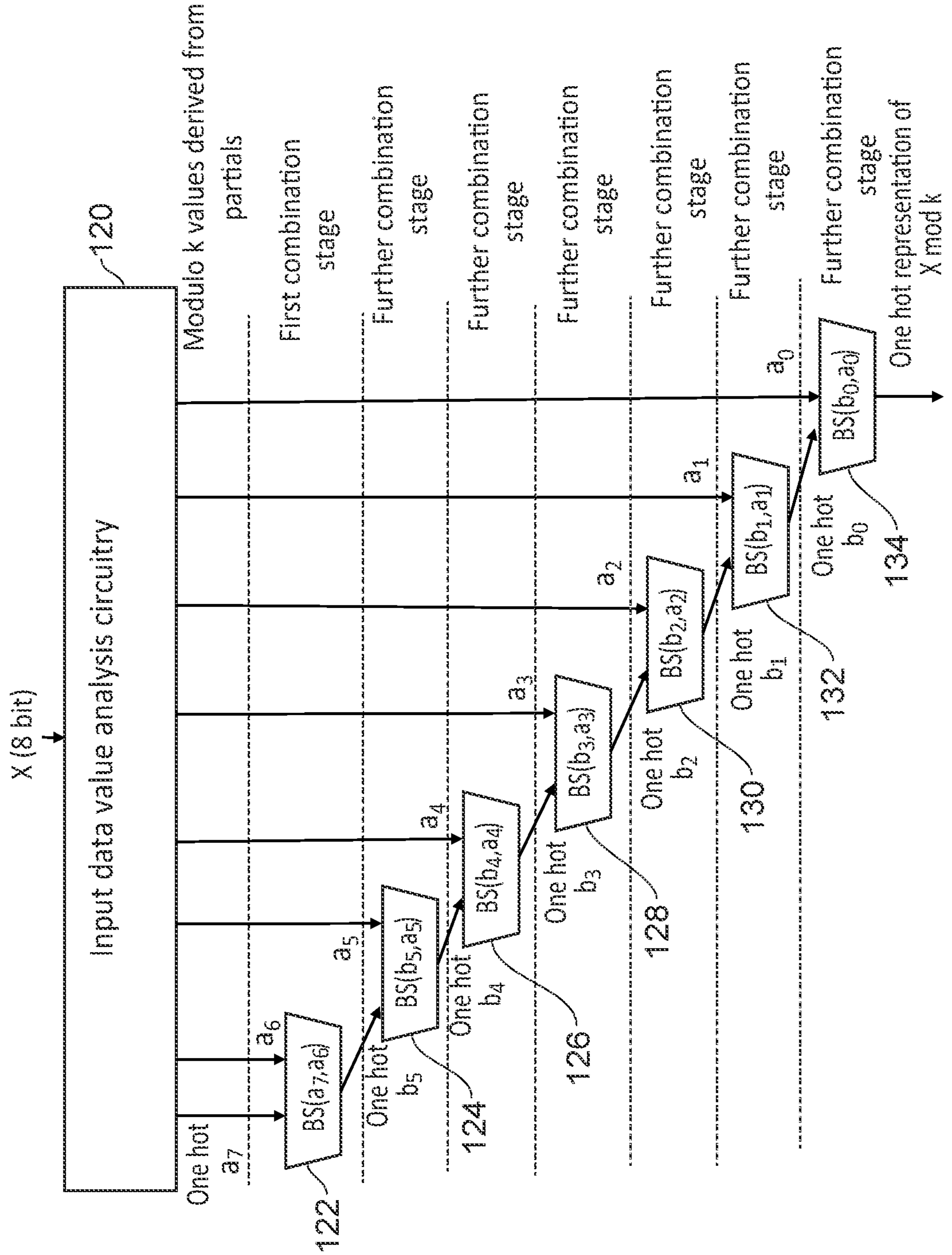
FIG. 11 schematically illustrates further details of the use of k-bit one hot representations to calculate a one hot representation of a modulo k value for an input data value according to various configurations of the present techniques.

FIG. 11 schematically illustrates the use of a plurality of combination stages to determine the one hot representation of X mod k for an 8 bit input value X using a k-bit one hot representation. The input data value analysis circuitry 120 considers the input data value X as a plurality of partial operands and, from the plurality of partial operands, derives a modulo k representation of each partial operand ($a_0$, $a_1$, $a_2$, $a_3$, $a_4$, $a_5$, $a_6$, and $a_7$). The input data value analysis circuitry 120 outputs the modulo k representation of one of the partial operands $a_7$ using the k-bit one hot representation. The remaining values can be output in any representation dependent on the particular circuit used to implement the barrel shifters 122-134.

The k-bit one hot value $a_7$ is input into the barrel shifter 122 of the first combination stage along with modulo k value aa. The k-bit one hot value $a_7$ is barrel shifted to the left by a number of bits determined by the value of $a_5$. The output is a k-bit one hot representation $b_5$. The k-bit one hot representation $b_5$ is input into the barrel shifter 124 along with the modulo k value as. The k-bit one hot value $b_5$ is barrel shifted to the left by a number of bits determined by the value of $a_5$. The output is a k-bit one hot representation $b_4$. The k-bit one hot representation $b_4$ is input into the barrel shifter 126 along with the modulo k value $a_4$. The k-bit one hot value $b_4$ is barrel shifted to the left by a number of bits determined by the value of $a_4$. The output is a k-bit one hot representation $b_3$. The k-bit one hot representation $b_3$ is input into the barrel shifter 128 along with the modulo k value $a_3$. The k-bit one hot value $b_3$ is barrel shifted to the left by a number of bits determined by the value of $a_3$. The output is a k-bit one hot representation $b_2$. The k-bit one hot representation $b_2$ is input into the barrel shifter 130 along with the modulo k value $a_2$. The k-bit one hot value $b_5$ is barrel shifted to the left by a number of bits determined by the value of $a_2$ The output is a k-bit one hot representation $b_1$. The k-bit one hot representation $b_1$ is input into the barrel shifter 132 along with the modulo k value $a_1$. The k-bit one hot value $b_5$ is barrel shifted to the left by a number of bits determined by the value of $a_1$. The output is a k-bit one hot representation $b_0$. The k-bit one hot representation $b_0$ is input into the barrel shifter 134 along with the modulo k value $a_0$. The k-bit one hot value $b_0$ is barrel shifted to the left by a number of bits determined by the value of $a_0$. The output is a k-bit one hot representation of X mod k.

Figure 12:
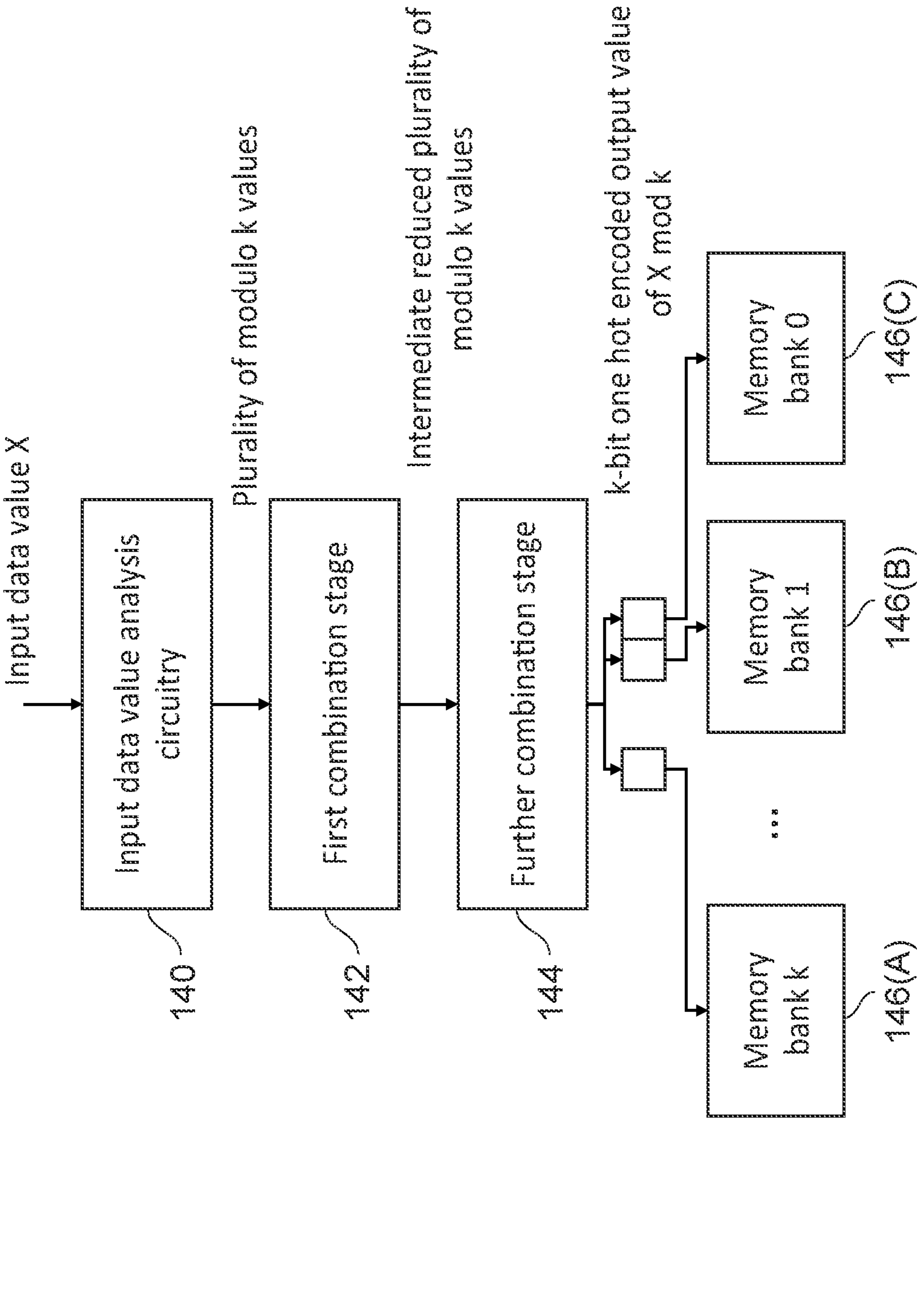
FIG. 12 schematically illustrates the use of modulo k value calculation circuitry to address k memory banks according to various configurations of the present techniques.

FIG. 12 schematically illustrates the apparatus according to some configurations of the present techniques. The apparatus is provided with input data value analysis circuitry 140 arranged to receive an input data value X which is considered as a plurality of partial operands. The input data value analysis circuitry 140 is arranged to generate a plurality of modulo k values each corresponding to one of the plurality of partial operands. The plurality of partial operands are fed into the first combination stage 142. The first combination stage combines groups of the plurality of modulo k values to produce an intermediate reduced plurality of modulo k values that are input into the further combination stage 144. The further combination stage 144 combines groups of the intermediate reduced plurality of modulo k values to produce a k-bit one hot encoded output value of X mod k. Each of the k-bits of this value are fed into a different memory bank 164 of a storage structure. The memory bank corresponding to the hot bit of the one hot representation will be activated and is used by the storage structure for a memory operation. In this way, the input data value analysis circuitry 140, the first combination stage 142, and the further combination stage 144 can be used to address k different memory banks of a storage structure providing an efficient addressing mechanism that can be used for storage structures with k memory banks w % here k is any positive integer.

Figure 13:
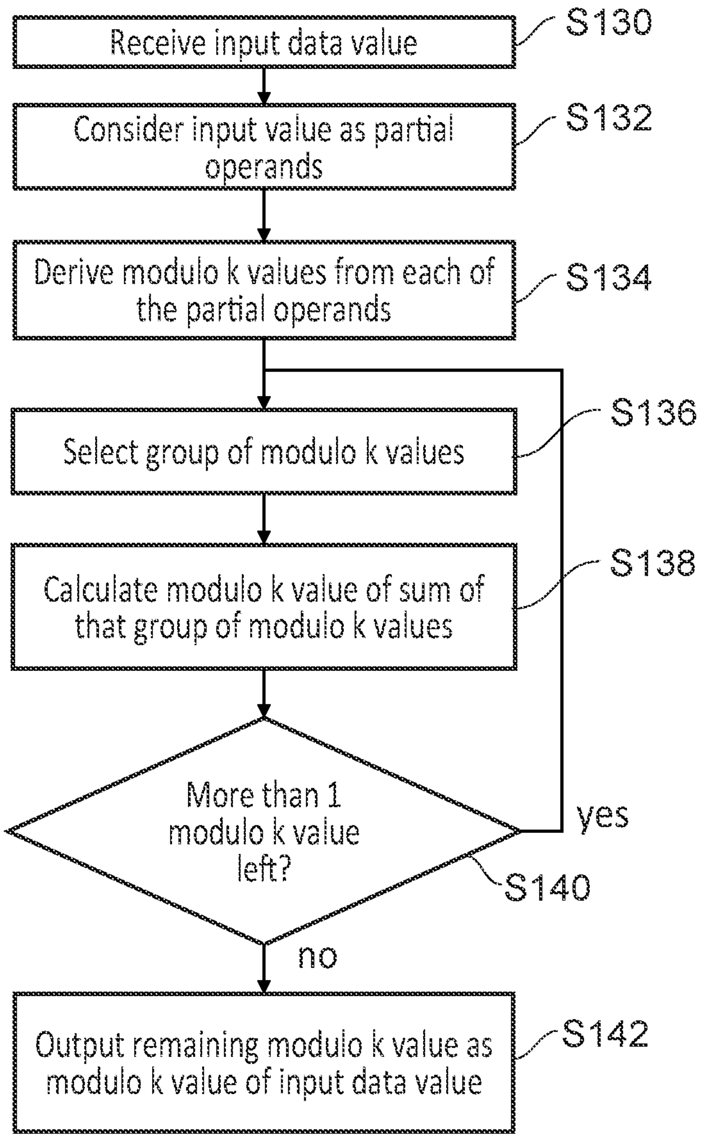
FIG. 13 schematically illustrates a sequence of steps used to calculate a modulo k value for an input data value according to various configurations of the present techniques.

FIG. 13 schematically illustrates a method of calculating a modulo k representation of an input data value according to various configurations of the present techniques. In step S130 an input data value is received by input data value analysis circuitry. Flow then proceeds to step S132 where the input data value analysis circuitry considers the input data value as a plurality of partial operands where a sum of the plurality of partial operands is equal to the input data value. Flow then proceeds to step S134 where the input data value analysis circuitry derives modulo k values from each of the partial operands. As discussed, in some example implementations, the modulo k values can be determined prior to hardware implementation and are incorporated, for example, as hardwired values in the input data value analysis circuitry. In such implementations the derivation in step S134 comprises selecting, for each partial operand, between the precomputed value for that partial operand and zero. Alternatively, the modulo k values can be derived, for example, using lookup tables. Flow then proceeds to step S136 where a group of the modulo k values of the partial operands are selected by a combination stage. Flow then proceeds to step S138 where the combination stage calculates the modulo k value of a sum of that group of modulo k values to produce a reduced plurality of modulo k values. Flow then proceeds to step S140 where it is determined if the reduced plurality of modulo k values comprises more than a single modulo k value. If yes, then flow returns to step S136. If, at step S140, it was determined that there is only a single modulo k value left then flow proceeds to step S142 where the remaining modulo k value is output as the modulo k value of the input data value.

Figure 14:
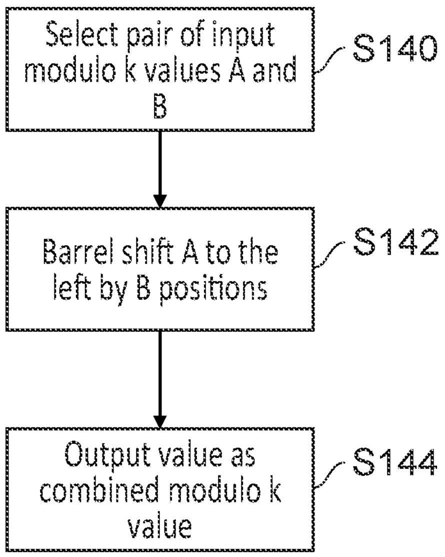
FIG. 14 schematically illustrates a sequence of steps used to calculate a modulo k value of a sum of a pair of input modulo k values according to various configurations of the present techniques.

FIG. 14 schematically illustrates a method for combining modulo k values according to various configurations of the present technique where one of the input values is a k-bit one hot representation of a modulo k value. Flow begins at step S140 where a pair of input values A and B are selected. The input value A is a k-bit one hot representation of a modulo k value. Flow then proceeds to step S142 where A is barrel shifted to the left by B positions. Flow then proceeds to step S144 where the barrel shifted value is output as the combined modulo k value equal to (A+B) mod k.

Figure 15:
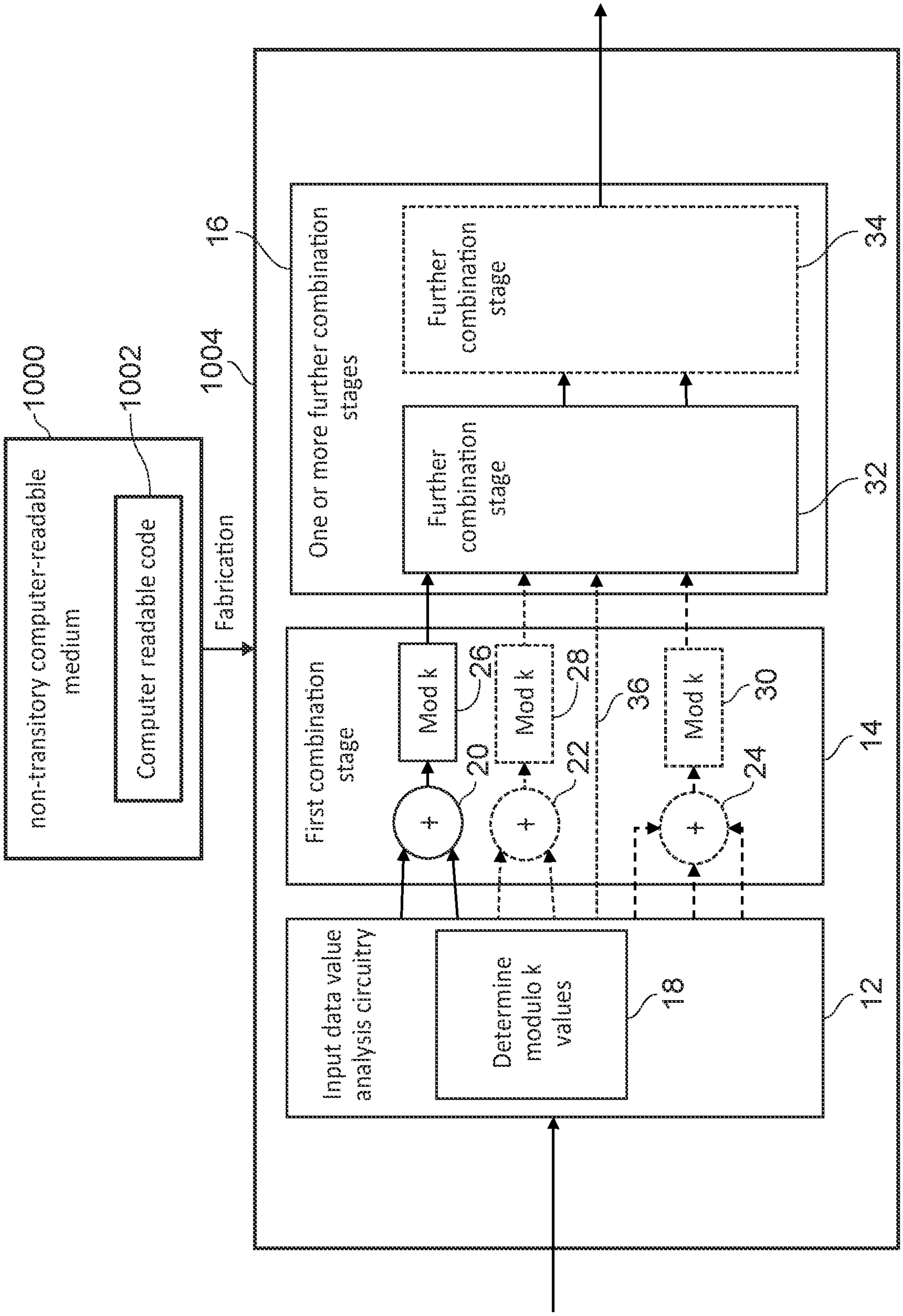
FIG. 15 schematically illustrates a non-transitory computer-readable storage medium for storing computer readable code for fabrication of an apparatus according to various configurations of the present techniques.

FIG. 15 schematically illustrates the fabrication of an apparatus according to various configurations of the present techniques. Fabrication may be carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. The fabricated design 1004 comprises the input data value analysis circuitry 12, the first combination stage 14 and one or more further combination stages 16 as described in reference to FIG. 1.

In brief overall summary there is provided a method and an apparatus for calculating an output modulo k value of an input data value. The apparatus is provided with input data value analysis circuitry to consider the input data value as a plurality of partial operands, and to determine a plurality of modulo k values corresponding to the plurality of partial operands. The apparatus is provided with modulo k calculation circuitry comprising plural combination stages to replace one or more groups of input modulo k values with one or more combined modulo k values. The plural combination stages comprise a first combination stage to receive the plurality of modulo k values as inputs and to output an intermediate reduced plurality of modulo k values, and one or more further combination stages to sequentially combine one or more groups of the intermediate reduced plurality of modulo k values to generate the output modulo k value.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Other examples are set out in the following clauses:

1. An apparatus comprising:
   input data value analysis circuitry configured to consider an input data value as a plurality of partial operands, and to determine a plurality of modulo k values comprising a modulo k value derived from each of the plurality of partial operands; and
   modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values,
   wherein the plurality of combination stages comprises a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.
2. The apparatus of clause 1, wherein:
   each of the one or more groups of input modulo k values is a pair of modulo k values; and each of the one or more groups of the intermediate reduced plurality of modulo k values is a pair of intermediate reduced modulo k values.

3. The apparatus of clause 1 or clause 2, wherein each of the plurality of combination stages is arranged to replace a single group of the input modulo k values with a single combined modulo k value.

4. The apparatus of clause 3, wherein:

in the first combination stage, the single group of the input modulo k values is a single group of the plurality of modulo k values, and in each of the one or more further combination stages the single group of the input modulo k values comprises at least one of the plurality of modulo k values and the combined modulo k value output from a preceding combination stage of the plurality of combination stages.

5. The apparatus of clause 1 or clause 2, wherein each of the plurality of combination stages comprises a plurality of combination units, each combination unit arranged to replace a different group of the one or more groups of input modulo k values with the combined modulo k value of the sum of that group of input modulo k values.

6. The apparatus of clause 5, wherein:

the plurality of modulo k values comprises $2^N$ modulo k values;

the first combination stage comprises $2^{N-1}$ combination units arranged to output the intermediate reduced plurality of modulo k values comprising $2^{N-1}$ intermediate modulo k values; and a number of combination units in each of the one or more further combination stages is half of a number of combination units in a preceding combination stage.

7. The apparatus of any preceding clause, wherein a sum of the plurality of partial operands is equal to the input data value.

8. The apparatus of any preceding clause, wherein each of the plurality of partial operands can be represented as a power of two.

9. The apparatus of any preceding clause, wherein at least one of the plurality of modulo k values is encoded using a k-bit one-hot representation.

10. The apparatus of clause 9, wherein each of the one or more groups of input modulo k values for each of the plurality of combination stages includes at least one modulo k value encoded using the k-bit one-hot representation.

11. The apparatus of clause 9, wherein each of the plurality of modulo k values are encoded using the k-bit one-hot representation.

12. The apparatus of clause 10 or clause 11, wherein the combined modulo k value is encoded as a k-bit one-hot representation by barrel shifting one of the group of input modulo k values that is encoded using the k-bit one-hot representation by an amount determined by a sum of each other input modulo k value of the group of input modulo k values.

13. The apparatus of any of clauses 9 to 12, wherein the output modulo k value is encoded using the k-bit one-hot representation.

14. The apparatus of any of clauses 9 to 12, wherein the output modulo k value is converted from the k-bit one-hot representation to a binary representation.

15. The apparatus of clause 14, wherein:

k equals three; and the output modulo k value is the two most significant bits of the k-bit one-hot representation.

16. The apparatus of any preceding clause, wherein the output is used for a chip enable signal for a memory device consisting of k banks.

17. The apparatus of any preceding clause, wherein the input data value analysis circuitry is configured such that a dependency of each of the plurality of modulo k values on a corresponding one of the plurality of partial operands is hardwired into the input data value analysis circuitry.

18. The apparatus of any preceding clause, wherein k is a number other than a power of two.

19. The apparatus of any preceding clause, wherein k equals three.

20. A method of operating modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values, the method comprising:

considering an input data value as a plurality of partial operands, and determining a plurality of modulo k values comprising a modulo k value derived from each of the plurality of partial operands;

with a first combination stage, receiving the plurality of modulo k values as inputs and outputting an intermediate reduced plurality of modulo k values; and with one or more further combination stages, sequentially combining one or more groups of the intermediate reduced plurality of modulo k values to generate an output modulo k value of the input data value.

21. A non-transitory computer-readable medium to store computer-readable code for fabrication of an apparatus comprising:

input data value analysis circuitry configured to consider an input data value as a plurality of partial operands, and to determine a plurality of modulo k values comprising a modulo k value derived from each of the plurality of partial operands; and modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values, wherein the plurality of combination stages comprises a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.

I claim:

1. An apparatus comprising:

input data value analysis circuitry configured to decompose an input data value into a plurality of partial operands, wherein a sum of the plurality of partial operands is equal to the input data value, and to determine a plurality of modulo k values comprising a modulo k value derived from each of the plurality of partial operands; and modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values, wherein the plurality of combination stages comprises a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.

2. The apparatus of claim 1, wherein:

each of the one or more groups of input modulo k values is a pair of modulo k values; and each of the one or more groups of the intermediate reduced plurality of modulo k values is a pair of intermediate reduced modulo k values.

3. The apparatus of claim 1, wherein each of the plurality of combination stages is arranged to replace a single group of the input modulo k values with a single combined modulo k value.

4. The apparatus of claim 3, wherein:

in the first combination stage, the single group of the input modulo k values is a single group of the plurality of modulo k values; and in each of the one or more further combination stages the single group of the input modulo k values comprises at least one of the plurality of modulo k values and the combined modulo k value output from a preceding combination stage of the plurality of combination stages.

5. The apparatus of claim 1, wherein each of the plurality of combination stages comprises a plurality of combination units, each combination unit arranged to replace a different group of the one or more groups of input modulo k values with the combined modulo k value of the sum of that group of input modulo k values.

6. The apparatus of claim 5, wherein:

the plurality of modulo k values comprises $2^N$ modulo k values;

the first combination stage comprises $2^{N-1}$ combination units arranged to output the intermediate reduced plurality of modulo k values comprising $2^{N-1}$ intermediate modulo k values; and a number of combination units in each of the one or more further combination stages is half of a number of combination units in a preceding combination stage.

7. The apparatus of claim 1, wherein each of the plurality of partial operands can be represented as a power of two.

8. The apparatus of claim 1, wherein at least one of the plurality of modulo k values is encoded using a k-bit one-hot representation.

9. The apparatus of claim 8, wherein each of the one or more groups of input modulo k values for each of the plurality of combination stages includes at least one modulo k value encoded using the k-bit one-hot representation.

10. The apparatus of claim 8, wherein each of the plurality of modulo k values are encoded using the k-bit one-hot representation.

11. The apparatus of claim 9, wherein each combined modulo k value is encoded as a k-bit one-hot representation by barrel shifting one of a corresponding group of input modulo k values that is encoded using the k-bit one-hot representation by an amount determined by a sum of each other input modulo k value of the corresponding group of input modulo k values.

12. The apparatus of claim 8, wherein the output modulo k value is encoded using the k-bit one-hot representation.

13. The apparatus of claim 8, wherein the output modulo k value is converted from the k-bit one-hot representation to a binary representation.

14. The apparatus of claim 13, wherein:

k equals three; and the output modulo k value is the two most significant bits of the k-bit one-hot representation.

15. The apparatus of claim 1, wherein the output modulo k value is used for a chip enable signal for a memory device consisting of k banks.

16. The apparatus of claim 1, wherein the input data value analysis circuitry is configured such that a dependency of each of the plurality of modulo k values on a corresponding one of the plurality of partial operands is hardwired into the input data value analysis circuitry.

17. The apparatus of claim 1, wherein k is a number other than a power of two.

18. The apparatus of claim 1, wherein k equals three.

19. A method of operating modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values, the method comprising:

decomposing an input data value into a plurality of partial operands, wherein a sum of the plurality of partial operands is equal to the input data value, and determining a plurality of modulo k values comprising a modulo k value derived from each of the plurality of partial operands;

with a first combination stage, receiving the plurality of modulo k values as inputs and outputting an intermediate reduced plurality of modulo k values; and with one or more further combination stages, sequentially combining one or more groups of the intermediate reduced plurality of modulo k values to generate an output modulo k value of the input data value.

20. A non-transitory computer-readable medium to store computer-readable code for fabrication of an apparatus comprising:

input data value analysis circuitry configured to decompose an input data value into a plurality of partial operands, wherein a sum of the plurality of partial operands is equal to the input data value, and to determine a plurality of modulo k values comprising a modulo k value derived from each of the plurality of partial operands; and modulo k calculation circuitry comprising a plurality of combination stages, each combination stage arranged to replace one or more groups of input modulo k values with one or more combined modulo k values, each combined modulo k value providing a modulo k value derived from a sum of an associated group of input modulo k values, thereby generating a reduced plurality of modulo k values, wherein the plurality of combination stages comprises a first combination stage configured to receive the plurality of modulo k values as inputs and to output an intermediate reduced plurality of modulo k values, and one or more further combination stages arranged to sequentially combine one or more groups of the intermediate reduced plurality of modulo k values to generate an output modulo k value of the input data value.

* * * * *